US012694029B2

(12) United States Patent
Liu et al.

(10) Patent No.: US 12,694,029 B2
(45) Date of Patent: Jul. 28, 2026

(54) ATTRIBUTE-AWARE VECTOR SEARCH USING SIMILARITY THRESHOLD ADJUSTMENT

(71) Applicant: eBay Inc., San Jose, CA (US)

(72) Inventors: Wei Liu, Zollikerberg (CH); Chuan Liu, Zurich (CH)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 19/092,051

(22) Filed: Mar. 27, 2025

(65) Prior Publication Data

US 2026/0099496 A1      Apr. 9, 2026

Related U.S. Application Data

(60) Provisional application No. 63/703,441, filed on Oct. 4, 2024.

(51) Int. Cl.
*G06F 16/2455*      (2019.01)
(52) U.S. Cl.
CPC .............................. *G06F 16/24553* (2019.01)
(58) Field of Classification Search
None
See application file for complete search history.

(56) References Cited

U.S. PATENT DOCUMENTS

| | | |
|---|---|---|
| 10,929,345 B2 | 2/2021 | Stoddard et al. |
| 11,182,562 B2 | 11/2021 | Lee et al. |
| 11,875,390 B2 | 1/2024 | Wang |
| 2020/0320769 A1 | 10/2020 | Chen et al. |
| 2021/0342658 A1 | 11/2021 | Chen |
| 2021/0403036 A1* | 12/2021 | Danna ................ G01C 21/3407 |
| 2023/0239336 A1 | 7/2023 | Greenwood et al. |
| 2023/0315993 A1 | 10/2023 | Nieborowski et al. |
| 2024/0070210 A1 | 2/2024 | Balasubramanian et al. |
| 2024/0073219 A1 | 2/2024 | Maizels et al. |

OTHER PUBLICATIONS

Taesung Park, NPL-Machine Learning for Deep Image Manipulation. May 2021.*

(Continued)

*Primary Examiner* — Tuankhanh D Phan

(74) *Attorney, Agent, or Firm* — Shook Hardy & Bacon L.L.P.

(57) ABSTRACT

Some aspects relate to technologies for performing attribute-aware vector searches using adjusted similarity thresholds. In accordance with some aspects, a search query is received. Items are mapped onto an extended embedding space based on encoded attributes for the plurality of items. The search query is also mapped onto the extended embedding space based on encoded attributes for the search query. An adjusted similarity threshold is generated based on a number of attributes to be matched for the search query. Using the adjusted similarity threshold, items that are similar to the search query in the extended embedding space are retrieved. Search results based on the one or more retrieved items can be provided as a response to the search query.

20 Claims, 5 Drawing Sheets

(56) References Cited

OTHER PUBLICATIONS

Ahmed et al., "Amazon Product Recommendation System", International Journal of Advanced Research in Computer and Communication Engineering Impact Factor 7.39, vol. 11, Issue 3, Mar. 2022, pp. 333-351.

Mazhar et al., "Similarity learning of product descriptions and images using multimodal neural networks", Natural Language Processing Journal 4, Sep. 2023, 16 pages.

Sarvi et al., "A Comparison of Supervised Learning to Match Methods for Product Search", SIGIR eCom'20, Jul. 30, 2020, 10 pages.

Xv et al., "E-commerce search via content collaborative graph neural network", Aug. 6, 2023, pp. 2885-2897.

Extended European Search Report received for European Patent Application No. 25204596.8, mailed on Jan. 16, 2026, 8 pages.

* cited by examiner

100

CLIENT DEVICE 120

CLIENT APPLICATION 122

CLIENT APPLICATION INTERFACE DATA 124

NETWORK 102

ITEM LISTING PLATFORM 110

ITEM LISTING OPERATIONS 130

ITEM LISTING INTERFACES 140

APPLICATIONS 160

ITEM LISTING DATABASES 150

ATTRIBUTE-AWARE VECTOR SEARCH ENGINE 170

Figure 2:
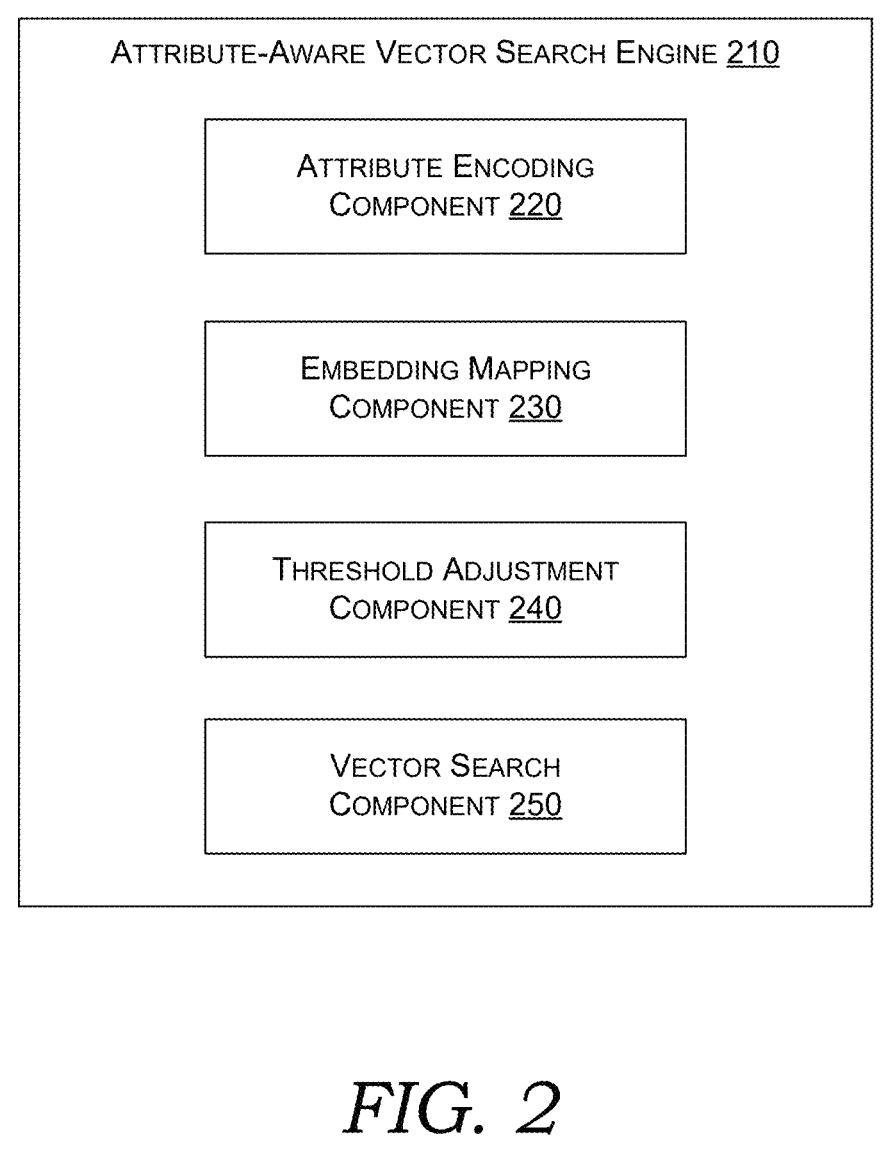

ATTRIBUTE-AWARE VECTOR SEARCH ENGINE 210

ATTRIBUTE ENCODING
COMPONENT 220

EMBEDDING MAPPING
COMPONENT 230

THRESHOLD ADJUSTMENT
COMPONENT 240

VECTOR SEARCH
COMPONENT 250

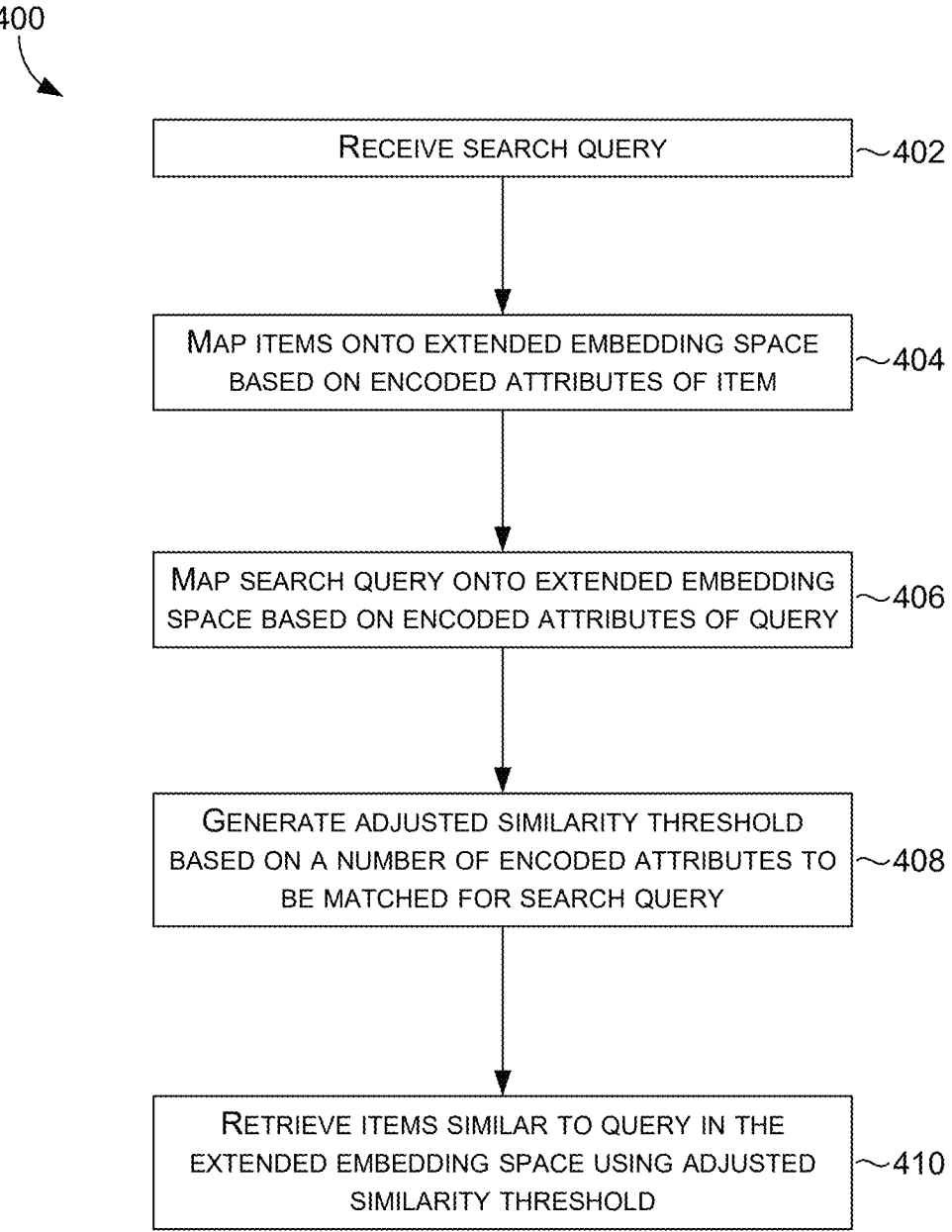

RECEIVE SEARCH QUERY    ~402

MAP ITEMS ONTO EXTENDED EMBEDDING SPACE BASED ON ENCODED ATTRIBUTES OF ITEM    ~404

MAP SEARCH QUERY ONTO EXTENDED EMBEDDING SPACE BASED ON ENCODED ATTRIBUTES OF QUERY    ~406

GENERATE ADJUSTED SIMILARITY THRESHOLD BASED ON A NUMBER OF ENCODED ATTRIBUTES TO BE MATCHED FOR SEARCH QUERY    ~408

RETRIEVE ITEMS SIMILAR TO QUERY IN THE EXTENDED EMBEDDING SPACE USING ADJUSTED SIMILARITY THRESHOLD    ~410

*FIG. 4*

ATTRIBUTE-AWARE VECTOR SEARCH USING SIMILARITY THRESHOLD ADJUSTMENT

CROSS-REFERENCE TO RELATED APPLICATIONS

This application claims the benefit of U.S. Provisional Application No. 63/703,441, filed Oct. 4, 2024, which is herein incorporated by reference in its entirety.

BACKGROUND

An exponential growth of large-scale data, both structured and unstructured, from sources such as social media, IoT devices, healthcare systems, and surveillance systems has been rapidly occurring. As the volume of data continues to grow, effective techniques for managing and retrieving meaningful information become increasingly important.

Vector search has become a crucial component in various domains, including recommendation systems, e-commerce, legal document retrieval, bioinformatics, and the like. Vector search, particularly through approximate nearest neighbor (ANN) algorithms, has emerged as a powerful method for efficiently identifying semantically similar items in vast datasets. These methods convert unstructured data into high-dimensional feature vectors and perform similarity search effectively. While these vector search methods can identify semantically similar items, many real-world applications require more than purely similarity-based results. For example, some applications require the integration of specific attribute constraints from structured data, rather than solely relying on similarity-based results.

SUMMARY

Various aspects of the technology described herein are generally directed to systems, methods, and computer storage media for, among other things, incorporating attribute constraints into vector search results. More particularly, aspects of the technology described herein use attributes to map items and queries onto an expanded query space and also use adjusted similarity thresholds to select items in the expanded query space. In accordance with some configurations, a search query is received. Items are mapped onto an extended embedding space based on encoded attributes for the plurality of items. The search query is also mapped onto the extended embedding space based on encoded attributes for the search query. An adjusted similarity threshold is generated based on a number of attributes to be matched for the search query. Using the adjusted similarity threshold, items that are similar to the search query in the extended embedding space are retrieved. Search results based on the one or more retrieved items can be provided as a response to the search query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIG. 2 provides a block diagram showing an attribute-aware vector search engine, in accordance with some aspects of the technology described herein;

FIG. 4 is a flow diagram showing an example method for attribute-aware vector search using an adjusted similarity threshold, in accordance with some aspects of the technology described herein.

DETAILED DESCRIPTION OF THE INVENTION

Overview

Figure 1:
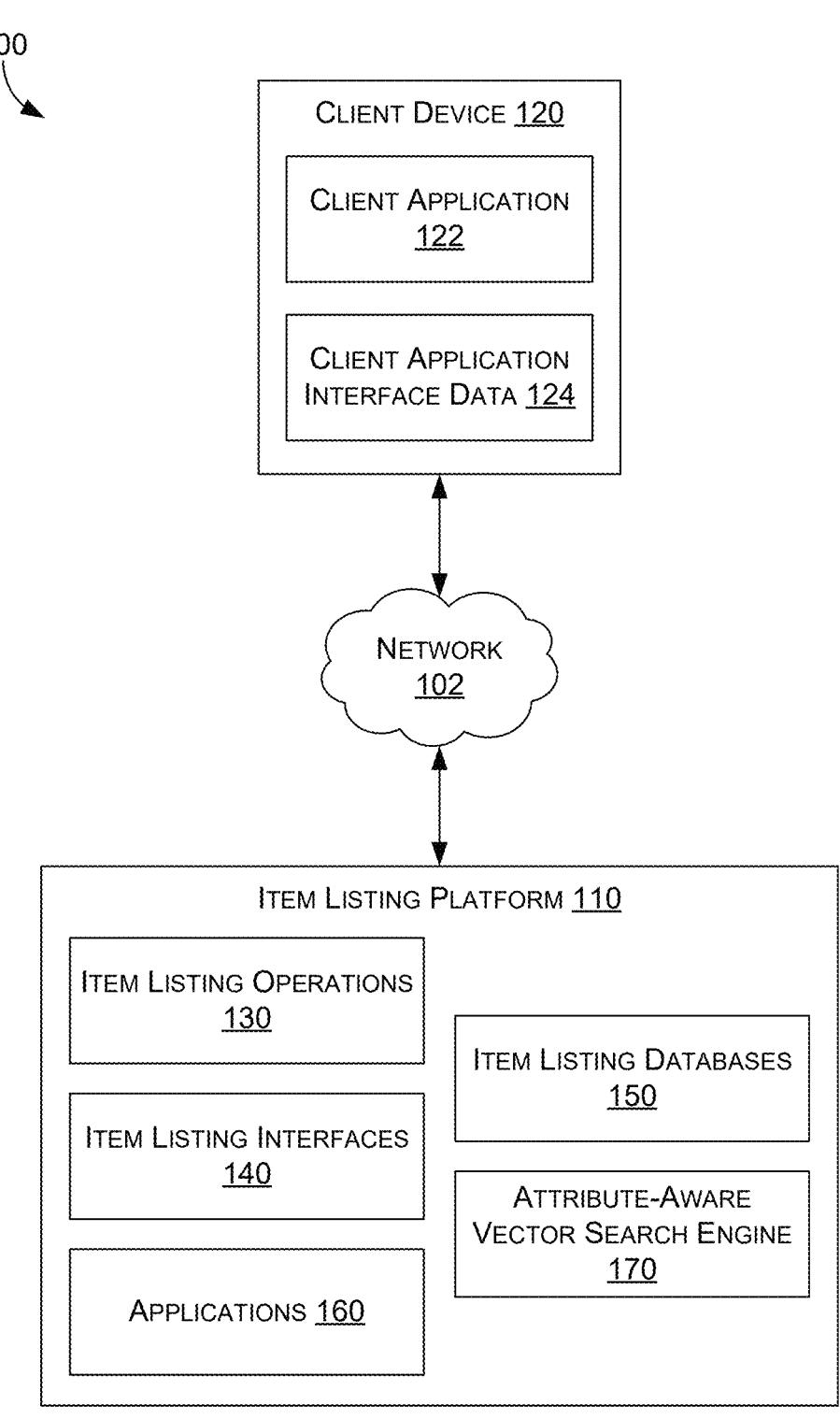
FIG. 1 provides an example system for use in implementing aspects of the technology described herein.

Search systems support storing items (products or assets) in item databases and performing searches for received queries to identify search result items based on the queries. An item (e.g., physical item or digital item) refers to a product or asset that is provided for listing on an item listing platform. Search systems support identifying, for received queries, result items from item databases. Item databases can specifically be for content platform or item listing platforms such as EBAY content platform, developed by EBAY INC., of San Jose, California.

Conventionally, search systems are not configured to effectively provide structured data attributes into vector search. For example, in e-commerce, a search for "women's summer dress" must not only return visually similar items but also match specific attributes like category (e.g., dress), gender (e.g., women), and season (e.g., summer). In automotive parts searches, a query for "brake pads" must yield parts that fit a specific make and model, alongside any visual or structural similarity. In legal document retrieval, lawyers searching for case law need to find documents that are not only semantically relevant but also match attributes like jurisdiction, court level, and date. In bioinformatics, researchers searching for similar protein structures must consider attributes like molecular weight, hydrophobicity, and function alongside structural similarity. In medical imaging, radiologists require the ability to find visually similar medical images also filtering based on patient-specific attributes like age, gender, and medical history.

To handle attributes, conventional search systems typically use one of a few approaches, such as: 1) two-stage filtering, which involves two separate subquery systems to perform attribute filtering and vector similarity search independently, which limits the accuracy, efficiency, and effectiveness of hybrid queries; and 2) single-stage filtering, which aims to address this limitation of two-stage filtering by concatenating vector similarity search and attribute filtering into a composite index, allowing for a joint pruning of items with dissimilar vectors and mismatched attributes in a single step, which can result in retrieving items that do not meet desired criteria.

As a result, users may be required to perform multiple searches to find relevant items, which unnecessarily consumes various computing resources of the system, such as processing power, network bandwidth, throughput, memory consumption, etc. In some instances, the multiple attempts to find a particular item may even completely fail to satisfy the user's goal, thus requiring the user to spend even more time and computing resources on the search process by repeating the process of issuing additional queries until the user finally accesses the desired content items. In some cases, the user may even give up searching because the search engine was not able to return desired search results after multiple searches.

These shortcomings of existing search systems adversely affect computer network communications. For example, each time a query is received, contents or payload of the search queries is typically supplemented with header information or other metadata, which is multiplied by all the additional queries needed to obtain relevant items. As such, there are throughput and latency costs by repetitively generating this metadata and sending it over a computer network. In some instances, these repetitive queries increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if multiple users repetitively issue queries, it is expensive because processing queries consumes a lot of computing resources. For example, for some search engines, a query execution plan may need to be calculated each time a query is issued, which requires a search system to find the least expensive query execution plan to fully execute the query. This decreases throughput and increases network latency, and can waste valuable time.

Aspects of the technology described herein address the shortcomings of existing search systems by providing a solution that effectively integrates structured data attributes into vector search. More particularly, aspects of the technology described herein use attributes to map items and queries onto an expanded query space and also use adjusted similarity thresholds to select items in the expanded query space. In accordance with some configurations, a search query is received. Items are mapped onto an extended embedding space based on encoded attributes for the plurality of items. The search query is also mapped onto the extended embedding space based on encoded attributes for the search query. An adjusted similarity threshold is generated based on a number of attributes to be matched for the search query. Using the adjusted similarity threshold, items that are similar to the search query in the extended embedding space are retrieved. Search results based on the one or more retrieved items can be provided as a response to the search query.

Aspects of the technology described herein provide a number of improvements over existing search systems. For instance, computing resource consumption is improved relative to existing technologies, while also improving search relevance. In particular, the technology allows for the integration of vector search and attribute constraint filtering, thereby eliminating the need for multi-stage search in which vector search and attribute constraints filter are performed separately. Additionally, by adjusting similarity thresholds based on attributes in search queries and using an expanded embeddings space where expended item embeddings and expanded query embeddings also encode attribute information, search result consistency is ensured without modifying how the original embeddings are generated or the underlying search algorithm. As can be appreciated, better results are achieved compared to traditional search systems that require extensive browsing and filtering of search results or executing multiple search queries.

Additionally, search result consistency is enhanced, thereby allowing the user to more quickly access relevant search results. This eliminates (or at least reduces) the extensive browsing and filtering of search results or executing multiple search queries. Accordingly, aspects of the technology described herein decrease computing resource consumption, such as processing power and network bandwidth. For instance, a user query (e.g., an HTTP request), would only need to traverse a computer network once (or fewer times relative to existing technologies).

In like manner, aspects of the technology described herein improve storage device or disk I/O and query execution functionality. As described above, the inability to effectively provide structured data attributes into vector search results in repetitive user queries and filter selections. This causes multiple traversals to disk I/O. In contrast, aspects described herein reduce storage device I/O because the user provides a reduced number of inputs so the computing system does not have to reach out to the storage device as often to perform a read or write operation. For example, by representing the original embedding and attribute constraints within a new embedding space and adjusting similarity thresholds, without modifying the original item embeddings or changing the underlying search algorithm, the system is able to more quickly access relevant search results. Accordingly, there is not as much wear due to query execution functionality.

Example System for Attribute-Aware Vector Search Using Adjusted Similarity Threshold Referring now to FIG. 1, an example system 100 in which implementations of the present disclosure may be employed. In particular, FIG. 1 shows a high level architecture of an example system 100 that can host a technical solution environment, or a portion thereof. It should be understood that this and other arrangements described herein are set forth as examples. For example, as described above, many elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

The system 100 can be a cloud computing environment that provides computing resources for functionality associated with the system 100. For example, the system 100 supports delivery of computing components and services-including servers, storage, databases, networking, and applications associated with the item listing platform 110 and client device 120. A plurality of client devices (e.g., client device 120) include hardware or software that access resources on the system 100. Client device 120 can include an application (e.g., client application 122) and interface data (e.g., client application interface data 124) that support client-side functionality associated with the system. The plurality of client devices can access computing components of the system 100 via a network (e.g., network 102) to perform computing operations.

The item listing platform 110 is responsible for providing a computing environment or architecture that includes the infrastructure that supports providing e-commerce functionality. The item listing platform 110 supports storing item data for items in item databases and providing a search system for receiving queries and identifying search results based on the queries. The item listing platform 110 may also provide a computing environment with features for managing, selling, buying, and recommending different types of items. Item listing platform 110 can specifically be for a content platform such as EBAY content platform or e-commerce platform, developed by EBAY INC., of San Jose, California.

The item listing platform 110 can provide item listing operations 130 and item listing interfaces 140. The item listing operations 130 can include service operations, communication operations, resource management operations, security operations, and fault tolerance operations that support specific tasks or functions in the item listing platform 110. The item listing interfaces 140 can include service interfaces, communication interfaces, resource interfaces, security interfaces, and management and monitoring interfaces that support functionality between the store management platform components. The item listing operations 130 and item listing interfaces 140 can enable communication, coordination and seamless functioning of the system 100.

By way of example, functionality associated with item listing platform 110 can include shopping operations (e.g., product search and browsing, product selection and shopping cart, checkout and payment, and order tracking); user account operations (e.g., user registration and authentication, and user profiles); seller and product management operations (e.g., seller registration and product listing and inventory management); payment and financial operations (e.g., payment processing, refunds and returns); order fulfillment operations (e.g., order processing and fulfillment and inventory management); customer support and communication interfaces (e.g., customer support chat/email and notifications); security and privacy interfaces (e.g., authentication and authorization, payment security); recommendation and personalization interfaces (e.g., product recommendations and customer reviews and ratings); analytics and report interfaces (e.g., sales and inventory reports, and user behavior analytics); and APIs and Integration Interfaces (e.g., APIs for Third-Party Integration).

The item listing platform 110 may comprise item listing databases (e.g., item listing databases 150) to manage and store different types of data efficiently. The item listing databases 150 can include relational databases, NoSQL databases, search databases, cache databases, content management systems, analytics databases, payment gateway database, customer relationship management databases, log and error databases, inventory and supply chain databases, and multi-channel databases that are used in combination to efficiently manage data and provide e-commerce experience for users.

The item listing platform 110 supports applications (e.g., applications 160) that may be a computer program, software component, or service that serves a specific function or set of functions to fulfil a particular item listing platform requirement or user requirement. Applications can be client-side (user-facing) and server-side (backend). By way of example, applications can include an online storefront application, mobile shopping app, admin and management console, payment gateway integration, user account and authentication application, search and personalization engines, inventory and stock management application, order processing and fulfillment application, customer support and communication tools, content management system, analytics and report applications, marketing and promotion applications, multi-channel integration applications, log and error tracking applications, customer relationship management (CRM) applications, security applications, and APIs and web services that are used in combination to efficiently deliver e-commerce experiences for users.

The item listing platform 110 includes an attribute-aware vector search engine 170. Generally, the attribute-aware vector search engine 170 maps items and search queries onto an extended embedding space based on encoded attributes. The attribute-aware vector search engine 170 also generates adjusted similarity thresholds based on a number of encoded attributes to be matched for search queries. The attribute-aware vector search engine 170 retrieves items from item listing databases 150 that are similar to search queries in the extended embedding space based on the adjusted similarity threshold.

FIG. 2 provides a block diagram showing aspects of an attribute-aware vector search engine 210 (which can correspond to the attribute-aware vector search engine 170 of FIG. 1). As shown in FIG. 2, the attribute-aware vector search engine 210 includes an attribute encoding component 220, an embedding mapping component 230, a threshold adjustment component 240, and a vector search component 250.

The attribute encoding component 220 encodes the attributes of items into a format suitable for embedding into the extended embedding space. In some aspects, the attribute encoding component 220 utilizes a one-hot encoding scheme to represent each attribute value as a binary vector, referred to herein as an encoded attribute. For each attribute from a set of defined attributes, the attribute encoding component 220 generates a unique binary vector where only one element is set to one based on an attribute value for the attribute, and all other elements are set to zero. This encoding allows the system to incorporate categorical attribute information into the vector representation of items, facilitating the integration of structured data attributes into the vector search process.

The embedding mapping component 230 uses the encoded attributes to map items and search queries onto an expanded embedding space. In some aspects, items and search queries can initially be represented with item embeddings and query embeddings in a first embedding space. The embedding mapping component 230 can map items and queries from the first embedding space to the expanded embedding space by incorporating encoded attributes with the item embeddings and query embeddings. For each item, in some aspects, the embedding mapping component 230 takes the encoded attributes for the item and combines them with the original item embedding for the item to create an extended item embedding of that item in the extended embedding space. For each search query, in some aspects, the embedding mapping component 230 takes the encoded attributes for the search query and combines them with the original query embedding for the search query to create an extended query embedding of that query in the extended embedding space. In some aspects, for any attribute from a set of defined attributes that are not present for an item or query, the embedding mapping component 230 provides a zero vector. The embedding mapping component 230 can concatenate the original embedding vectors with the one-hot encoded attribute vectors, resulting in a new, higher-dimensional vector that represents both the semantic content and the attribute information of each item and each search query. The extended embeddings map items and queries onto the extended embedding space, enabling the system to perform similarity searches that consider both vector similarity and attribute constraints.

The threshold adjustment component 240 adjusts the similarity threshold used in the vector search process based on the number of attributes specified in the search query to provide an adjusted similarity threshold. In some configurations, the threshold adjustment component 240 calculates an adjusted similarity threshold as a function of the original similarity threshold, the number of attributes to be matched for the search query, and the total number of attributes defined for the system. The adjusted similarity threshold ensures that the search results meet the attribute constraints specified in the query while maintaining the overall similarity criteria. This adjustment allows the system to retrieve items that are both semantically similar and match the specified attributes.

The vector search component 250 performs search operations in the extended embedding space using adjusted similarity thresholds. In some configurations, vector search component 250 calculates similarity values (e.g., cosine similarity) between extended item embeddings and the extended embedding of a search query being process. The vector search component 250 then compares the calculated similarity values against the adjusted similarity threshold to determine which items are similar to the query. The vector search component 250 retrieves the items that satisfy the adjusted similarity threshold, ensuring that the search results are both relevant to the query and meet the specified attribute constraints. This unified approach allows the system to efficiently handle complex search queries that require both semantic similarity and attribute matching.

To illustrate operation of attribute-aware vector search in accordance with some aspects, let I be a set of items. Each item i in the set of items ($i \in I$) has a number of characteristics. First, each item i has an item embedding in an original embedding space. For instance, this could be a normalized embedding vector $v_i \in \mathcal{V} \subset \mathbb{R}^D$, where $\mathcal{V}$ is the original embedding space and $\|v_i\|=1$. Second, each item i has a set of categorical attributes $A_i = \{a_{i1}, a_{i2}, \ldots, a_{iM}\}$, where: $a_{ij} \in \mathcal{A}_j$ represents the value of the j-th attribute for item i; $\mathcal{A}_j$ is the set of all possible values for the j-th attribute; and M is the total number of categorical attributes.

A given query q also has a number of characteristics. First, a query q has a query embedding in the original embedding space. For instance, this could be a normalized embedding vector $v_q \in \mathcal{V}$. Second, a query q has a subset of attribute indices $\mathcal{M}_q \in \{1, 2, \ldots, M\}$. This subset denotes the attribute(s) in the query that need to be matched exactly.

Given a similarity threshold $\theta \in \{0, 1\}$, the set of items similar to the query item q with exact attribute matching is defined as:

$$\mathcal{R} = \{i \in I \mid \cos(v_i, v_q) \geq \theta \text{ and } \forall j \in \mathcal{M}_q, a_{ij} = a_q 2$$

To incorporate categorical attributes into the vector-based similarity search within the embedding space, without the need for separate attribute filtering, a mapping function $f$ is utilized to transform the original embedding space $\mathcal{V}$ and the attribute values into an extended embedding space $\mathcal{V}' \subset \mathbb{R}^{D'}$ with D'>D:

$$f: \mathcal{V} + \prod_{j=1}^{M} \mathcal{A}'_j \to \mathcal{V}', \text{ with } \mathcal{A}'_j = \mathcal{A}_j \cup \{\varepsilon\}$$

where $\varepsilon$ denotes the absence of an attribute from $\mathcal{A}_j$ (i.e., the attribute is not included in the query).

For an item $i \in I$, an extended item embedding in the extended embedding space $$(v'_i \in \mathcal{V}')$$

that incorporates all attribute values $a_{ij}$ of the item i is provided as follows:

$$v'_i = f(v_i, a_{i1}, a_{i2}, \ldots, a_{iM})$$

For a query q, an extend query vector in the extended embedding space $$(v'_q \in \mathcal{V}')$$

that incorporates attributes in the query q is provided as follows:

$$v'_q = f(v_q, b_{q1}, b_{q2}, \ldots, b_{qM}) \text{ where}$$
$$b_{qj} = \begin{cases} a_{qj}, & \text{if } j \in \mathcal{M}_q \\ \varepsilon, & \text{otherwise} \end{cases}$$

using $\varepsilon$ for unspecified attributes (i.e., attributes not included in the query).

The mapping function $f$ and similarity threshold $\theta' \in (0, 1]$ can be defined such that:

$$\mathcal{R}' = \{i \in I \mid \cos(v'_i, v'_q) \geq \theta'\}$$

satisfies $$\mathcal{R}' = \mathcal{R}$$

This ensures that, without introducing any additional attribute filtering methods, the set of similar items retrieved in the extended embedding space $\mathcal{V}'$ matches the set $\mathcal{R}$ retrieved in the original embedding space $\mathcal{V}$, while maintaining exact attribute matching using only vector-based similarity search.

In accordance with some aspects, the original embedding space is augmented with encoded attribute information, allowing performance of both similarity measurement and attribute matching within a unified framework. To do so, some configurations use four aspects: attribute encoding; embedding mapping; threshold adjustment; and vector search. Each of these aspects is discussed in further detail below.

Attribute Encoding: For each attribute value $a_{ij} \in \mathcal{A}_j$, a one-hot encoding function is defined as:

$$\phi_j: \mathcal{A}_j \to \{0, 1\}^{k_j}$$

where: $k_j = |\mathcal{A}_j|$ is the number of possible values for the j-th attribute; $\phi_j(a_{ij}) = e_{ij}$ is the one-hot encoding of the attribute value $a_{ij}$. For the absence of an attribute $(a_{ij}=\epsilon)$, $\phi_j(\epsilon)=0_{kj}$ is defined as a zero vector of dimension $k_j$.

Embedding Mapping: The mapping function $f$ for an item $i \in I$ can be defined as follows:

$$v'_i = f(v_i, a_{i1}, a_{i2}, \ldots, a_{iM}) = [v_i; \phi_1(a_{i1}); \phi_2(a_{i2}); \ldots; \phi_M(a_{iM})]$$

That is:

$$v'_i = [v_i; e_{i1}; e_{i2}; \ldots; e_{iM}]$$

where $e_{ij}=\phi_j(a_{ij})$ is the one-hot encoding for the j-th attribute of item i, and $[\ \cdot\ ;\ \cdot\ ]$ denotes vector concatenation.

The mapping function $f$ for a query q uses the modified attribute values $b_{qj}$ defined above:

$$v'_q = f(v_q, b_{q1}, b_{q2}, \ldots, b_{qM})$$
$$= [v_q; \phi_1(b_{q1}); \phi_2(b_{q2}); \ldots; \phi_M(b_{qM})]$$

That is:

$$v'_q = [v_q; t_{q1}; t_{q2}; \ldots, t_{qM}]$$

where $t_{qj}$ is defined as:

$$t_{qj} = \begin{cases} e_{qj}, & \text{if } b_{qi} \in \mathcal{A}_j \\ 0_{kj}, & \text{if } b_{qj} = \varepsilon \end{cases}$$

Here, $e_{qj}=\phi_j(a_{qj})$ is the one-hot encoding of the attribute value $a_{qj}$, and $0_{kj}$ is a zero vector of dimension $k_j$.

Threshold Adjustment: The following function can be used to adjust the similarity threshold from $\theta$ to $\theta'$:

$$\theta' = \frac{m_q + \theta}{\sqrt{(m_q + 1)(M + 1)}}$$

where $m_q = |\mathcal{M}_q|$ is the number of attributes to be matched for the query q, and M is the total number of categorical attributes.

Vector Search: Vector search is performed in the new embedding space $\mathcal{V}'$ using the adjusted similarity threshold $\theta'$. For instance, this can involve:

$$\mathcal{R}^r = \{i \in I \mid \cos(v'_i, v'_q) \geq \theta'\}$$

This method effectively integrates attribute constraints into the similarity search process, enabling the retrieval of items that are both similar in the embedding space and match the specified attributes, all within a unified framework.

The following provides an example to illustrate aspects of the present technology. Consider a scenario with two categorical attributes, each with three possible attribute values: Color ($\mathcal{A}_1$): {Red, Green, Blue}; and Size ($\mathcal{A}_2$): {Small, Medium, Large}. Also, consider two items $i_1$ and $i_2$, along with query q. In this example, item $i_1$ has the attribute values Color: Red and Size: Small; item $i_2$ has attribute values Color: Green and Size: Small; and query q includes attribute value Color: Red. Table 1 below illustrates how the embeddings and one-hot encoded attributes are combined for these items and the query.

TABLE 1

| Item and Query Details | |
|---|---|
| Item/Query | Details |
| Item $i_1$ | Embedding $v_{i1} = [0.6, 0.8]$ |
| | Attributes: $a_{i1, 1} = $ Red, $a_{i1, 2} = $ Small |
| | Extended Embedding: |
| | v $v_{i1}' = [0.6, 0.8; [1, 0, 0]; [1, 0, 0]]$ |
| Item $i_2$ | Embedding $v_{i2} = [0.8, 0.6]$ |
| | Attributes: $a_{i2, 1} = $ Green, $a_{i2, 2} = $ Small |
| | Extended Embedding: |
| | $v_{i2}' = [0.8, 0.6; [0, 1, 0]; [1, 0, 0]]$ |
| Query q | Embedding $v_q = [0.6, 0.8]$ |
| | Attributes to match: $a_{q, 1} = $ Red |
| | Extended Embedding: |
| | $v_q' = [0.7071, 0.7071; [1, 0, 0]; [0, 0, 0]]$ |

Figure 3B:
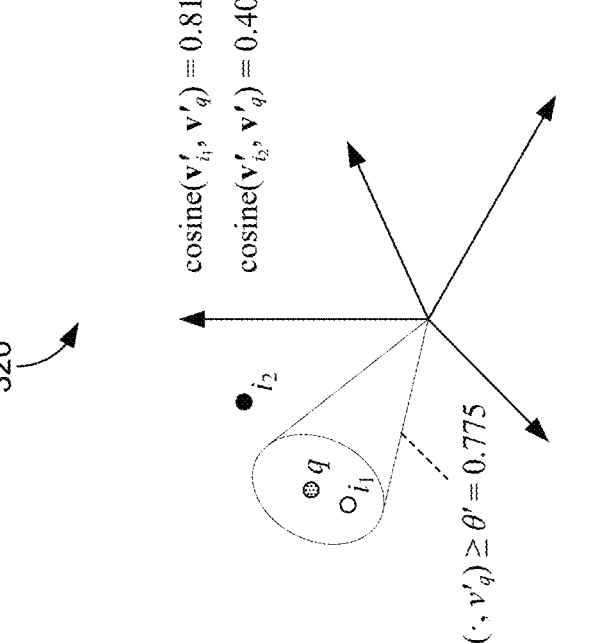
FIGS. 3A and 3B illustrate an example of an original embedding space and an extended embedding space, in accordance with some aspects of the technology described herein.
Figure 3A:
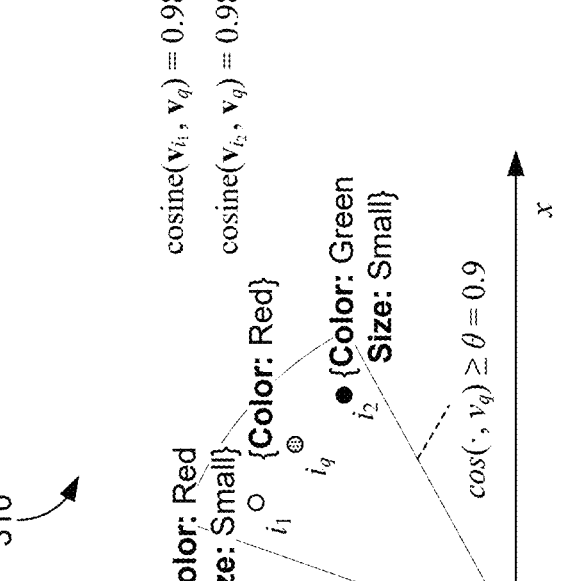

In this example, the aim is to retrieve items similar to the query q that have the attribute "Red" in color, using a similarity threshold of $\theta=0.9$. FIGS. 3A and 3B illustrate an original embedding space 310 and an extended embedding space 320, respectively. In the original embedding space 310 ($\mathcal{V}$), both items $i_1$ and $i_2$ are close to the query q, with the cosine similarities for both items exceeding the threshold. However, only item $i_1$ matches the query's specified attribute of being "Red" in color. Without incorporating attribute information, distinguishing between $i_1$ and $i_2$ based solely on embedding similarity is not possible.

FIG. 3B illustrates mapping the items $i_1$ and $i_2$ and the query q onto the extended embedding space 320 ($\mathcal{V}'$) using the mapping function $f$. Additionally, the similarity threshold has been adjusted to provide the following adjusted similarity threshold:

$$\theta' = \frac{mq + \theta}{(mq + 1)(M + 1)} = \frac{1 + 0.9}{(1 + 1)(2 + 1)} \approx 0.775$$

In the extended embedding space 320 and using the adjusted similarity threshold, the cosine similarity for item $i_1$ satisfies the adjusted similarity threshold; while the cosine similarity for item $i_2$ does not satisfy the adjusted similarity threshold. As such, by mapping the items $i_1$ and $i_2$ and the query q onto the extended embedding space 320 and using the adjusted similarity threshold, only item $i_1$ is retrieved. The set of similar items is preserved while incorporating exact attribute matching, all without modifying the original item embeddings. In this way, a unified framework is provided for handling attribute constraints in vector search, maintaining search consistency across different embedding spaces.

Example Method for Attribute-Aware Vector Search Using Adjusted Similarity Threshold Referring now to FIG. 4, a flow diagram is provided that illustrates an example method 400 for attribute-aware vector search using an adjusted similarity threshold, in accordance with some implementations of the present disclosure. The method 400 can be performed, for instance, by the item listing platform 110 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, a search query is received. This can involve obtaining a query that specifies the search criteria for retrieving relevant items. The search query can comprise natural language text and can include any number of attributes that help define the parameters for the search.

Items are mapped onto an extended embedding space based on encoded attributes for each item, as shown at block 404. In some aspects, this can involve accessing item embeddings for the items in an embedding space and generating extended item embeddings in the extended embedding space by concatenating the item embeddings with sets of encoded attributes for the items. The encoded attributes may include one-hot encodings of attribute values for the items.

As shown at block 406, the search query is also mapped onto the extended embedding space based on encoded attributes for the search query. In some aspects, this can involve accessing a query embedding for the search query in the embedding space and generating an extended query embedding in the extended embedding space by concatenating the query embedding with a set of encoded attributes for the query. The encoded attributes for the query may include one-hot encodings of attribute values present in the query and zero vectors for attributes not present in the query.

An adjusted similarity threshold is generated at block 408 based on a number of attributes to be matched for the search query. In some aspects, the adjusted similarity threshold is generated as a function of the number of attributes to be matched for the search query, a predefined similarity threshold, and the total number of attributes in a defined set of attributes.

As shown at block 410, items that are similar to the search query in the extended embedding space are retrieved using the adjusted similarity threshold. This can involve, for instance, determining whether the cosine similarity between the extended item embeddings and the extended query embedding satisfies the adjusted similarity threshold, thereby identifying items that are similar to the search query.

Embodiments of the present invention have been described with reference to several inventive features (e.g., operations, systems, engines, and components) associated with a system. Inventive features described include: operations, interfaces, data structures, and arrangements of computing resources associated with providing the functionality described herein relative with reference to a system.

Embodiments of the present invention relate to the field of computing, and more particularly to systems. The following described exemplary embodiments provide a system, method, and program product to, among other things, refining similarity results using an attribute-aware vector search engine in a system. Therefore, the present embodiments have the capacity to improve the technical field of system technology by providing more efficient and more accurate search results. For example, search engines described for this technical solution provide a specific improvement over prior systems, resulting in an improved search results. In particular, the particular manner of providing search results do not use conventional user interface methods. The technical solution incorporates attribute constraints into vector search results.

Exemplary Operating Environment

Figure 5:
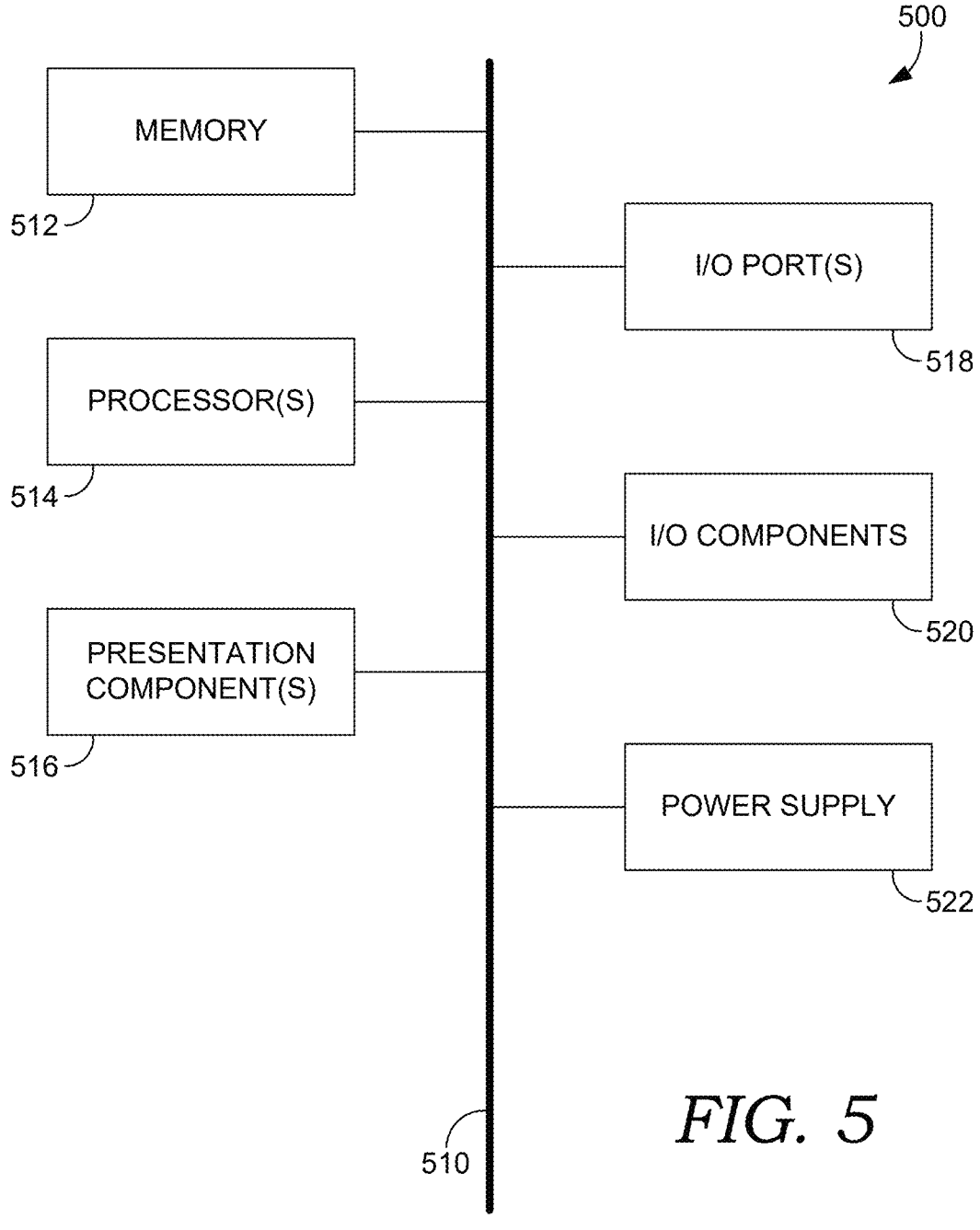
FIG. 5 is a block diagram of an exemplary computing environment suitable for use in implementing aspects of the technology described herein.

Having described implementations of the present disclosure, an exemplary operating environment in which embodiments of the present technology may be implemented is described below in order to provide a general context for various aspects of the present disclosure. Referring initially to FIG. 5 in particular, an exemplary operating environment for implementing embodiments of the present technology is shown and designated generally as computing device 500. Computing device 500 is but one example of a suitable computing environment and is not intended to suggest any limitation as to the scope of use or functionality of the technology. Neither should the computing device 500 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 516, input/output (I/O) ports 518, input/output components 520, and illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present technology. Distinction is not made between such categories as "workstation," "server," "laptop," "handheld device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. The terms "computer storage media" and "computer storage medium" do not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, unless indicated otherwise, the term "or" includes the conjunctive, the disjunctive, and both (a or b thus includes either a or b, as well as a and b). Further, the term "and/or" includes the conjunctive, the disjunctive, and both (a and/or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
receiving a search query;
mapping a plurality of items onto an extended embedding space by generating, for each item of the plurality of items, an extended item embedding formed by combining encoded attributes of the item with an item embedding for the item;
mapping the search query onto the extended embedding space by generating an extended query embedding formed by combining encoded attributes for the search query with a query embedding for the search query;
generating an adjusted similarity threshold based on a number of attributes to be matched for the search query; and
retrieving one or more items of the plurality of items by determining that a similarity measure between an extended item embedding for each of the one or more items and the extended query embedding satisfies the adjusted similarity threshold.

2. The computer-implemented method of claim 1, wherein mapping a first item from the plurality of items onto the extended embedding space comprises employing a mapping function that maps a first item embedding for the first item in an embedding space to a first extended item embedding for the first item in the extended embedding space.

3. The computer-implemented method of claim 1, wherein mapping a first item from the plurality of items onto the extended embedding space comprises:
accessing a first item embedding for the first item in an embedding space;
accessing a set of encoded attributes for the first item; and
generating a first extended item embedding by concatenating the first item embedding with the set of encoded attributes for the first item.

4. The computer-implemented method of claim 3, wherein the set of encoded attributes for the first item comprises a set of one-hot encodings of attribute values for the first item.

5. The computer-implemented method of claim 1, wherein mapping the search query onto the extended embedding space comprises employing a mapping function that maps the query embedding for the search query in an embedding space to the extended query embedding for the search query in the extended embedding space.

6. The computer-implemented method of claim 1, wherein mapping the search query onto the extended embedding space comprises:
accessing the query embedding for the search query in an embedding space;
accessing the encoded attributes for the search query; and
generating the extended query embedding by concatenating the query embedding with the encoded attributes for the search query.

7. The computer-implemented method of claim 6, wherein the encoded attributes for the search query comprise a one-hot encoding of an attribute value for an attribute in the search query and a zero vector for an attribute not in the search query.

8. The computer-implemented method of claim 1, wherein the adjusted similarity threshold is generated as a function of the number of attributes to be matched for the search query, a similarity threshold, and a total number of attributes in a defined set of attributes.

9. The computer-implemented method of claim 1, wherein retrieving a first item of the plurality of items that is similar to the search query in the extended embedding space using the adjusted similarity threshold comprises:
determining a cosine similarity of a first extended item embedding for the first item in the extended embedding space and the extended query embedding for the search query in the extended embedding space satisfies the adjusted similarity threshold.

10. One or more computer-storage media having computer-executable instructions embodied thereon that, when executed by a computing system, cause the computing system to perform operations, the operations comprising:
receiving a search query;
mapping a plurality of items onto an extended embedding space by generating, for each item of the plurality of items, an extended item embedding formed by combining encoded attributes of the item with an item embedding for the item;
mapping the search query onto the extended embedding space by generating an extended query embedding formed by combining encoded attributes for the search query with a query embedding for the search query;
generating an adjusted similarity threshold based on a number of attributes to be matched for the search query; and
retrieving one or more items of the plurality of items by determining that a similarity measure between an extended item embedding for each of the one or more items and the extended query embedding satisfies the adjusted similarity threshold.

11. The one or more computer-storage media of claim 10, wherein mapping a first item from the plurality of items onto the extended embedding space comprises employing a mapping function to map a first item embedding for the first item in an embedding space to a first extended item embedding for the first item in the extended embedding space; and
wherein mapping the search query onto the extended embedding space comprises employing the mapping function to map the query embedding for the search query in the embedding space to the extended query embedding for the search query in the extended embedding space.

12. The one or more computer-storage media of claim 10, wherein mapping a first item from the plurality of items onto the extended embedding space comprises:
accessing a first item embedding for the first item in an embedding space;
accessing a set of encoded attributes for the first item, wherein the set of encoded attributes for the first item comprises a set of one-hot encodings of attribute values for the first item for a defined set of attributes; and
generating a first extended item embedding by concatenating the first item embedding with the set of encoded attributes for the first item.

13. The one or more computer-storage media of claim 12, wherein mapping the search query onto the extended embedding space comprises:
accessing the query embedding for the search query in the embedding space;
accessing the encoded attributes for the search query, wherein the encoded attributes for the search query comprise a one-hot encoding of an attribute value for each attribute from the defined set of attributes in the search query and a zero vector for each attribute from the defined set of attributes not in the search query; and generating the extended query embedding by concatenating the query embedding with the set of encoded attributes for the search query.

14. The one or more computer-storage media of claim 10, wherein the adjusted similarity threshold is generated as a function of the number of attributes to be matched for the search query, a similarity threshold, and a total number of attributes in a defined set of attributes.

15. The one or more computer-storage media of claim 10, wherein retrieving a first item of the plurality of items that is similar to the search query in the extended embedding space using the adjusted similarity threshold comprises:

determining a cosine similarity of a first extended item embedding for the first item in the extended embedding space and the extended query embedding for the search query in the extended embedding space satisfies the adjusted similarity threshold.

16. A computer system comprising:

one or more computer processors; and one or more computer storage media storing computer-useable instructions that, when used by the one or more computer processors, cause the one or more computer processors to perform operations, the operations comprising:

receiving a search query;

mapping a plurality of items onto an extended embedding space by generating, for each item of the plurality of items, an extended item embedding formed by combining encoded attributes of the item with an item embedding for the item;

mapping the search query onto the extended embedding space by generating an extended query embedding formed by combining encoded attributes for the search query with a query embedding for the search query;

generating an adjusted similarity threshold based on a number of attributes to be matched for the search query; and retrieving one or more items of the plurality of items by determining that a similarity measure between an extended item embedding for each of the one or more items and the extended query embedding satisfies the adjusted similarity threshold.

17. The computer system of claim 16, wherein mapping a first item from the plurality of items onto the extended embedding space comprises employing a mapping function to map a first item embedding for the first item in an embedding space to a first extended item embedding for the first item in the extended embedding space; and wherein mapping the search query onto the extended embedding space comprises employing the mapping function to map the query embedding for the search query in the embedding space to the extended query embedding for the search query in the extended embedding space.

18. The computer system of claim 16, wherein mapping a first item from the plurality of items onto the extended embedding space comprises:

accessing a first item embedding for the first item in an embedding space;

accessing a set of encoded attributes for the first item, wherein the set of encoded attributes for the first item comprises a set of one-hot encodings of attribute values for the first item for a defined set of attributes; and generating a first extended item embedding by concatenating the first item embedding with the set of encoded attributes for the first item.

19. The computer system of claim 18, wherein mapping the search query onto the extended embedding space comprises:

accessing the query embedding for the search query in the embedding space;

accessing the encoded attributes for the search query, wherein the encoded attributes for the search query comprise a one-hot encoding of an attribute value for each attribute from the defined set of attributes in the search query and a zero vector for each attribute from the defined set of attributes not in the search query; and generating the extended query embedding by concatenating the query embedding with the set of encoded attributes for the search query.

20. The computer system of claim 16, wherein the adjusted similarity threshold is generated as a function of the number of attributes to be matched for the search query, a similarity threshold, and a total number of attributes in a defined set of attributes.

* * * * *